US008760742B2

(12) United States Patent
Leopold et al.

(10) Patent No.: US 8,760,742 B2
(45) Date of Patent: Jun. 24, 2014

(54) METHOD AND DEVICE FOR INDIVIDUAL HOLOGRAPHIC DRUM EXPOSURE

(75) Inventors: André Leopold, Berlin (DE); Christian Kunath, Berlin (DE); Jens Ehreke, Berlin (DE); Gerhard Hochenbleicher, Fürstenfeldbruck (DE); Christian Klepzig, München (DE); Michael Langgassner, Pliening (DE)

(73) Assignee: Bundesdruckerei GmbH, Berlin (DE)

( * ) Notice: Subject to any disclaimer, the term of this patent is extended or adjusted under 35 U.S.C. 154(b) by 675 days.

(21) Appl. No.: 12/676,408

(22) PCT Filed: Sep. 3, 2008

(86) PCT No.: PCT/EP2008/007408
§ 371 (c)(1),
(2), (4) Date: May 25, 2010

(87) PCT Pub. No.: WO2009/030502
PCT Pub. Date: Mar. 12, 2009

(65) Prior Publication Data
US 2010/0253987 A1    Oct. 7, 2010

(30) Foreign Application Priority Data
Sep. 4, 2007    (DE) .......................... 10 2007 042 385

(51) Int. Cl.
*G03H 1/20*    (2006.01)
*G03H 1/02*    (2006.01)
(52) U.S. Cl.
CPC ....................................... *G03H 1/20* (2013.01)
USPC ................................................ 359/12; 359/8
(58) Field of Classification Search
USPC ..................... 359/12, 22–25; 355/2; 365/216; 430/1–2
See application file for complete search history.

(56) References Cited
U.S. PATENT DOCUMENTS

| 4,995,685 A | 2/1991 | Armstrong et al. |
| 7,245,406 B2 * | 7/2007 | Funada et al. .................. 359/12 |

(Continued)

FOREIGN PATENT DOCUMENTS

| CA | 2244018 | * | 7/1998 | ............... G03H 1/20 |
| DE | 102005054396 A1 | | 6/2006 | |

(Continued)

OTHER PUBLICATIONS

Machine Translation of Sato by ESPACENET. Obtained Mar. 26, 2013.*

*Primary Examiner* — Scott J Sugarman
*Assistant Examiner* — Robert E Tallman
(74) *Attorney, Agent, or Firm* — Laurence A. Greenberg; Werner H. Stemer; Ralph E. Locher (57) ABSTRACT

A method and a device produce an individualized hologram from a generated light beam. According to the method, the light beam is individually modulated in a spatial light modulator, a holographic recording material is arranged relative to a holographic master, and the individually modulated light beam is guided in such a manner that at least part of the individually modulated light beam is refracted and/or reflected on the holographic master and an interference pattern representing the individualized hologram is produced in the holographic recording material. The individually modulated light beam is displaced relative to the holographic recording material and the holographic master to scan the entire holographic master. The recording material is arranged so as to rest on a cylindrical drum or a cylindrical drum segment and the drum is rotated about a drum axis of the drum or the drum segment during scanning of the holographic master.

20 Claims, 3 Drawing Sheets

(56) References Cited

U.S. PATENT DOCUMENTS

| | | |
|---|---|---|
| 2005/0206984 A1* | 9/2005 | Kawano et al. .................... 359/8 |
| 2006/0001936 A1* | 1/2006 | Chen ............................... 359/35 |
| 2006/0067179 A1* | 3/2006 | Matsumoto et al. ......... 369/47.1 |
| 2006/0289114 A1 | 12/2006 | Guionnet et al. |
| 2007/0121433 A1* | 5/2007 | Nagura ...................... 369/44.11 |
| 2007/0285746 A1* | 12/2007 | Millington et al. ............... 359/2 |
| 2008/0037083 A1* | 2/2008 | Ogasawara ....................... 359/3 |
| 2008/0218817 A1* | 9/2008 | Grygier et al. .................... 359/9 |
| 2009/0162756 A1 | 6/2009 | Staub et al. |

FOREIGN PATENT DOCUMENTS

| | | |
|---|---|---|
| DE | 102006016139 A1 | 10/2007 |
| DE | 102006061220 A1 * | 6/2008 |
| EP | 0401566 A2 | 12/1990 |
| EP | 0896260 A2 | 2/1999 |
| JP | 03148687 A | 6/1991 |
| JP | 7134536 A | 5/1995 |
| JP | 8123307 A | 5/1996 |
| JP | 08123307 A * | 5/1996 |

\* cited by examiner

METHOD AND DEVICE FOR INDIVIDUAL HOLOGRAPHIC DRUM EXPOSURE

BACKGROUND OF THE INVENTION

Field of the Invention

The invention relates to a method for producing individualized holograms, used in particular as security elements for security documents and/or valuable documents, and also to a device for producing individualized holograms.

Security elements serve to protect a security document and/or valuable document against forgery or copying. Holograms constitute one type of security elements. Security elements often also contain individualizing indications, for example serial numbers, identification numbers, biometric data, images (passport photographs), etc. These can be provided as plain text or in image form or in optically coded fashion or in machine-readable fashion.

The basic procedure during the production of holograms with individualizing indications is described in the literature reference EP 0 896 260 A2, for example. The basic principles are explained briefly below. Firstly, a holographic master with a master hologram is produced. The holographic master is then positioned behind a holographic recording material. Coherent light, for example from a laser, is radiated onto that side of the holographic recording material which is remote from the holographic master, typically with a defined wavelength and a defined angle of incidence, in accordance with the holographic pattern to be reconstructed from the holographic master. Said light penetrates through the holographic recording material and is diffracted and/or reflected by the master, whereby the hologram is generated by interference with the incident light and the hologram is imaged in the holographic recording material and stored by photochemical or photophysical processes in the holographic recording material. In this case, the holographic master can be designed in such a way that it is sensitive to a plurality of wavelengths and correspondingly diffracts the latter.

The prior art discloses digital projectors which operate with spatial light modulators in the form of liquid crystal displays (LCD). The functioning corresponds to the projection of a transparency, for example, where the spatial light modulator replaces the transparency.

The prior art furthermore discloses digital projectors which comprise a DMD (digital micro mirror device) as spatial modulator. The literature reference DE 2005 054 396 A1 discloses the use of a spatial light modulator in the form of a digital micromirror device (DMD) for marking objects.

Since the interference structures that form in the interference pattern of the holographic recording material are of the order of magnitude of a micrometer, the holographic recording material has to be situated in a defined position in each case during recording. Since the holographic recording material is generally embodied as a film, the holographic recording material, after arrangement relative to the holographic master, in the case of the methods and devices known in the prior art, requires a settling time of the order of magnitude of a few seconds. Said settling time is of the order of magnitude of that time which is required to expose a hologram in the holographic recording material. Even if this exposure time could be greatly shortened, the settling time would permit an increase in throughput during the production of holograms only by a factor of 2.

BRIEF SUMMARY OF THE INVENTION

Therefore, it is an object of the invention to provide a production method and also a device for producing individualized holograms which reduce a manufacturing time.

DEFINITIONS

A security element is a structural unit comprising at least one security feature. A security element can be an independent structural unit that can be connected, for example adhesively bonded, to a security document and/or valuable document, but it can also be an integral part of a security document and/or valuable document. One example of the former is a visa that can be adhesively bonded onto a security document and/or valuable document. One example of the latter is a hologram integrated, for example laminated, into a banknote or an identity card.

A security feature is a structure which can be produced or reproduced in an unauthorized manner only with increased effort (compared with simple copying) or not at all.

A pattern typically consists of a multiplicity of pattern units or pixels arranged alongside one another. The pattern units or pixels of a pattern are assigned to one another and arranged laterally with respect to one another in a defined manner, typically in two spatial dimensions, and when considered overall produce a representation, for example an image, symbol, logo, text (letters, numerals, alphanumeric) or code (e.g. bar code).

The following shall be mentioned merely by way of example as security documents and/or valuable documents: personal identity cards, passports, ID cards, access control identity cards, visas, tax stamps, tickets, driving licenses, motor vehicle papers, banknotes, checks, postage stamps, credit cards, any smart cards and adhesive labels (e.g. for product security). Such security documents and/or valuable documents typically have a substrate, a printing layer and optionally a transparent covering layer. A substrate is a carrier structure to which the printing layer comprising information, images, patterns and the like is applied. Appropriate materials for a substrate include all conventional paper- and/or plastic-based materials in the art.

A spatial light modulator (SLM) permits two-dimensionally spatially resolved illumination or irradiation of a usually planar object with modulated intensity. This can involve for example a DMD (Digital Micro Mirror Device) chip, an LCD (Liquid Crystal Display) transmission display or an LCoS (Liquid Crystal on Silicon) display. What they all have in common is that a multiplicity of SLM pixels are formed, wherein each SLM pixel can be activated or deactivated independently of other SLM pixels (intermediate stages are also possible), whereby patterns or images can be projected by means of corresponding driving of the SLM pixels. By virtue of the free drivability, it is also readily possible to generate different images or patterns one after another in temporal succession, for example in the form of a passport photograph.

A code or pattern is individualizing if it is unique for a person or an object or a group of persons or objects from a larger overall set of persons or objects. A code which is individualizing for a group of persons within the overall set of the inhabitants of a country is for example the town/city of residence. A code which is individualizing for a person is for example the number on the personal identity card or the passport photograph. A code which is individualizing for a group of banknotes within the overall set of banknotes is the value. What is individualizing for a banknote is the serial number. Examples of non-individualizing codes or patterns are coats of arms, seals, national emblems, etc.

A holographic recording material is a layer composed of a material which is photosensitive, in which layer holographs can be stored by irreversible, but also reversible photochemical and/or photophysical processes by way of exposure. The photopolymers that are often used in holography shall be mentioned merely by way of example.

The term color is understood as a wavelength or a spectral line in the context of the invention. Mixed colors have a plurality of different wavelengths or spectral lines. The term color therefore encompasses not only the visible region but also UV and IR.

BASIC PRINCIPLES OF THE INVENTION AND PREFERRED EMBODIMENTS

In order to solve the problem, it is proposed that the holographic recording material is arranged in a manner bearing on a drum, and the drum is rotated about a drum axis of the drum during the scanning of the holographic master. The fact that the holographic recording material bears on the drum means that the recording material settles very much more rapidly. Furthermore, the holographic recording material, if it is embodied for example as an elongated film in which a multiplicity of holograms are exposed, can be arranged in a manner bearing on the drum in a region of the drum, that is to say be arranged in a sector of the drum which is angularly remote from the region at which the hologram is recorded by means of an exposure. In particular, therefore, a method for producing individualized holograms is proposed, in which a light beam is generated, the light beam is individually modulated in a spatial light modulator (SLM), holographic recording material is arranged relative to a holographic master and the individually modulated light beam is guided in such a way that at least part of the individually modulated light beam is diffracted and/or reflected at the holographic master and is brought to interference with the individually modulated light beam in the holographic recording material, such that an interference pattern representing the individualized hologram forms in the holographic recording material, wherein the individually modulated light beam is moved relative to the holographic recording material and the holographic master in order to scan the entire holographic master, wherein, in order to solve the technical problem, it is provided that the holographic recording material is arranged in a manner bearing on the drum, and the drum is rotated about a drum axis of the drum during the scanning of the holographic master. An individualized or individual hologram can therefore by means of a device for producing individualized holograms, comprising a light source for generating a coherent light beam, a spatial light modulator (SLM) for individually modulating the light beam into an individually modulated light beam, a holographic master, and a feeding unit that can be used to arrange a holographic recording material with respect to passage of radiation with the individually modulated light beam relative to the holographic master, and wherein the light beam is guided in such a way that at least part of the light beam is diffracted and/or reflected at the holographic master and is superimposed with the individually modulated light beam in the holographic recording material, such that an interference pattern representing the individualized hologram forms in the holographic recording material, wherein the individually modulated light beam can be moved relative to the holographic recording material and the holographic master in order to scan the entire holographic master. In order to solve the technical problem, it is provided that the feeding unit comprises a cylindrical drum and is designed to arrange the holographic recording material in a manner bearing on the drum or the drum segment relative to the master, wherein the drum is coupled to a drum drive unit in order to rotate the drum about a drum axis during the scanning of the holographic master. What can be achieved by feeding the holographic recording material in a manner bearing on the drum of the feeding unit or a drum segment is that the recording material settles more rapidly and/or in a manner temporally preceding an exposure. If the holographic recording material is guided for example in a manner covering almost a whole circumference of the drum in a manner bearing on the drum or the drum segment, then the bearing arrangement can be implemented at a distance from the location at which the recording material is exposed, and can therefore be effected in a temporally preceding fashion. This enables the production process to be accelerated and the throughput of a device to be significantly increased, without having to accept a loss of quality which, when a hologram is imaged in a holographic recording material that is not at rest, reduces its quality. Such a reduction does not occur in the case of the proposed method since the holographic recording material, as a result of bearing on the drum, has already settled to a sufficient extent at the point in time of its exposure.

Particularly simple beam guidance is achieved with a method and a device in which the holographic master is or has been incorporated into the cylindrical drum. During the feeding of the holographic recording material, the latter is thus arranged in front of the holographic master. During the exposure of the holographic recording material, firstly the individually modulated light beam radiates through said holographic recording material, then impinges on the holographic master and is at least partly diffracted and/or reflected and forms an interference pattern representing the individualizing hologram in the holographic recording material. The incorporation of the holographic master into the drum or the drum segment affords the advantage that the scanning of the holographic master and of the holographic recording material can be performed jointly in a synchronized manner by means of the drum movement, that is to say the rotation of the drum about the drum rotation axis. Simplified optical beam guidance is thereby made possible.

The light beam is preferably generated as a strip-shaped light beam. For this purpose, the device can comprise a strip light source that generates a strip-shaped light beam. The light source is in any event embodied such that it generates sufficiently coherent light. The coherence has to be provided both spatially and temporally in order to be able to generate a holographic interference image. In order to generate a strip-shaped light beam, in one embodiment, a strip generating optical unit for generating a strip-shaped light beam can be provided, which comprises, in particular, a cylindrical lens and/or a holographic optical element. Further optical elements for generating a strip-shaped light beam are known to the person skilled in the art. The light source is preferably a laser that can generate light in the infrared, visible and/or ultraviolet wavelength or frequency range.

In a particularly simple embodiment, the spatial light modulator is a line display. In this case, the line display can comprise one or a plurality of pixel rows and, in the latter case, could also be referred to as a display embodied in strip-shaped fashion. If the light beam is individually modulated by means of a line display, then it is possible to use an areal pattern line by line/strip by strip for individualizing the individually modulated light beam in order to image this individual pattern line by line/strip by strip into the individualized hologram. In this case, the individual pixels of the line display can be driven freely. The areal pattern is represented and imaged successively line by line/strip by strip in this way. This embodiment is distinguished by the fact that, besides the rotating drum, no further movable elements need be present.

When a line display is used as spatial light modulator, however, the film material moves during the exposure time as a result of the rotation of the drum about the drum axis that takes place in this time. On account of the curvature of the drum, this furthermore means that a distance between the holographic recording material and the spatial light modulator changes during the exposure. In order to avoid imaging unsharpness, therefore, an imaging optical unit that images the individually modulated light beam, that is to say the spatial light modulator, onto the holographic recording material and the holographic master must have a depth of field that compensates for this distance difference during the exposure time.

A smallest possible path difference in an imaging length is obtained if the recording material is chosen at 0° relative to a normal to the surface of the recording material at the impinging point of the individually modulated light beam, that is to say that, relative to the individually modulated light beam, the latter is exposed at the apex point of the rotating drum.

Since, when a line display is used for imaging an areal pattern, the individual modulation changes temporally abruptly at the line transitions, this disadvantageously becomes apparent at the line transitions in the generated hologram as well. Therefore, preference is given to an embodiment of the invention in which the spatial light modulator is embodied in areal fashion and scanning is effected using the, preferably strip-shaped, light beam.

By virtue of the fact that, in such an embodiment, the spatial light modulator embodied in areal fashion is scanned at a scanning speed of the light beam, this speed is added to the speed of the holographic recording material moving in a manner bearing on the drum. Since an imaging optical unit having an imaging factor m is preferably used, the individually modulated light beam moves at an impinging location, which is an impinging line for strip-shaped light, on the holographic material in a tangential plane at a scanning speed multiplied by the imaging factor m. Consequently, the optical guidance of the light beam should preferably be chosen such that, although the individually modulated light beam impinges on the drum in stationary fashion with respect to the rotation axis of the drum, the individually modulated information "transported" by the light beam in this case is moved in a manner synchronized with the film movement. This means that the light beam scans the spatial light modulator in the time in which the holographic recording material and the holographic master move once over their entire recording and respectively imaging or scanning region. As a result, no abrupt transitions occur at pixel line transitions. A "uniform" hologram arises.

In one preferred embodiment, it is provided that the spatial light modulator is embodied in areal fashion and is scanned by means of the, preferably strip-shaped, light beam and the speed of the (imaged) individually modulated light beam is directed via a deflection mirror mounted such that it can be rotated about the mirror rotation axis onto the holographic recording material, wherein a rotational speed of the deflection mirror is defined such that, for an individually modulated light beam that is stationary before the deflection, an impinging location (an impinging line) of the individually modulated light beam on the holographic recording material moves in the tangential plane of the recording material at a speed which corresponds to a tangential speed of the holographic recording material on account of the rotation of the drum, and a scanning speed is defined such that the impinging location of the individually modulated light beam on the holographic recording material moves, with deflection mirror not rotating, in the tangential plane at a speed which compensates for a tangential speed of the holographic recording material on account of the rotation of the drum or of the drum segment. The mention of compensation means that said speed is identical in magnitude but points in an opposite direction. The device therefore comprises a spatial light modulator embodied in areal fashion and a deflection mirror mounted such that it can be rotated about a mirror axis, which deflection mirror is arranged relative to the spatial light modulator and the drum or the drum segment in order to direct the (imaged) individually modulated light beam onto the holographic recording material, wherein a drive unit is coupled to the mirror, said drive unit controlling a rotational speed of the mirror such that for an individually modulated light beam that is stationary before the deflection, an impinging location (an impinging line) of the individually modulated light beam on the holographic recording material moves in the tangential plane of the recording material at a speed which corresponds to a tangential speed of the holographic recording material on account of the rotation of the drum or of the drum segment, and a scanning speed for the scanning of the spatial light modulator is defined such that the impinging location of the individually modulated light beam on the holographic recording material moves, with deflection mirror not rotating, in the tangential plane at a speed which compensates for the tangential speed of the holographic recording material on account of the rotation of the drum or of the drum segment. The deflection mirror thus ensures that a stationary individually modulated light beam always impinges on the same location of the recording material when the latter rotates on account of the rotation of the drum. The scanning speed of the spatial light modulator is chosen, then, such that the imaged individually modulated light beam compensates for a movement of the recording material such that, during the scanning of the spatial light modulator, the entire holographic master is scanned once as well. The impinging line is therefore stationary, and preferably collinear, with respect to the drum rotation axis.

It should be emphasized at this juncture that the holographic master incorporated into the drum does not have to embodied such that it corresponds to a 360° cylinder segment. Rather, a plurality of identical or different holographic masters can be incorporated into a drum into a cylindrical surface, preferably a cylindrical lateral surface, of the drum. In such an embodiment, the mirror rotation axis is oriented parallel to the rotation axis of the drum. Exposure of, or passage of radiation through, the recording material is preferably effected at an intersection line or an intersection point of a line (n) connecting the two axes. In the case of such an arrangement as well, however, the impinging angle of the individually modulated light beam on the recording material readily changes with the rotational position of the deflection mirror, that is to say depending on the scanning position of the light beam on the spatial light modulator.

In another embodiment it is provided that the scanning speed of the light beam that is required for the scanning of the light beam and compensation of the rotary movement are effected by means of a translational movement of an optical system. Therefore, in one preferred embodiment, it is provided that an optical system is moved in a translational manner transversely with respect to the drum rotation axis, that a light beam incident in stationary fashion is converted into a scanning light beam that moves relative to the spatial light modulator, wherein the optical system comprises at least one beam splitter, and the light beam is deflected via the beam splitter onto the spatial light modulator and the light beam individually modulated by the spatial light modulator is directed onto the holographic recording material by the beam splitter. In this case, the translational movement can be performed at a speed which has the effect that the speed of the individually modulated light beam impinging on the recording material compensates for the movement of the recording material on account of a rotation of the drum or of the drum segment. In the case of such an embodiment, a beam splitter is arranged between the spatial light modulator and the impinging location of the individually modulated light beam. In this case, the light beam individually modulated by the spatial light modulator passes through the beam splitter in a straight line. Consequently, an imaging length is constant in each case, independently of a depth of field of the imaging optical unit.

In one development of the invention, it is provided that the optical system additionally comprises the spatial light modulator and a deflecting mirror fixedly oriented relative to the beam splitter, wherein the optical system is moved perpendicularly to the drum axis and to an impinging direction of the individually modulated light beam on the holographic recording material. In order to perform the translational movement, the optical system, which is also referred to as optical individualization system, is coupled to a displacement unit that performs the translational movement at a displacement speed.

The drum rotational speed of the drum is chosen in a manner dependent on an intensity of the light beam such that a quantity of energy introduced into the recording material, during a period of passage of radiation that arises on account of the rotation of the drum or of the drum segment with respect to the individually modulated light beam, if the individually modulated light beam is or is kept stationary with respect to the drum rotation axis, corresponds to a quantity of energy appropriate for recording the individualized hologram in the recording material.

In order to be able to control the individual speeds that occur, in one embodiment it is provided that at least one position-dependent light-sensitive sensor is arranged in the drum rotation axial direction outside an illumination region for the individualized hologram, preferably alongside the drum, preferably in a tangential plane of the impinging line of the individually modulated light beam on the recording material or thereabove, wherein the individually modulated light beam is embodied such that the position-sensitive and light-sensitive sensor, when radiation passes through the recording material, is swept over by a marginal region of the individually modulated light beam and the at least one sensor is integrated into a closed control loop with a controller designed for controlling the rotational speed of the deflection mirror or a displacement speed of the optical individualization system in order to keep an impinging line of the light beam on the recording material stationary with respect to the drum rotation axis. This affords the possibility of tracking one of the speeds by means of a control loop.

In one preferred development it is provided that at least one further position-sensitive and light-sensitive sensor is arranged relative to a drum axial direction at an opposite end of the illumination region for the individualized hologram. As a result, possible tilting of the strip-shaped light beam with respect to the drum rotation axis can also be ascertained and, if appropriate, compensated for by means of actuators.

In order to be able to monitor and control the rotational speed of the drum, in one preferred embodiment, an incremental encoder is provided on the drum or the drum segment, and a further control unit is provided for controlling the drum speed on the basis of signals of the incremental encoder.

Further advantages of the invention will become apparent from the following detailed description of individual preferred exemplary embodiments. In this case:

DESCRIPTION OF THE INVENTION

Figure 1:
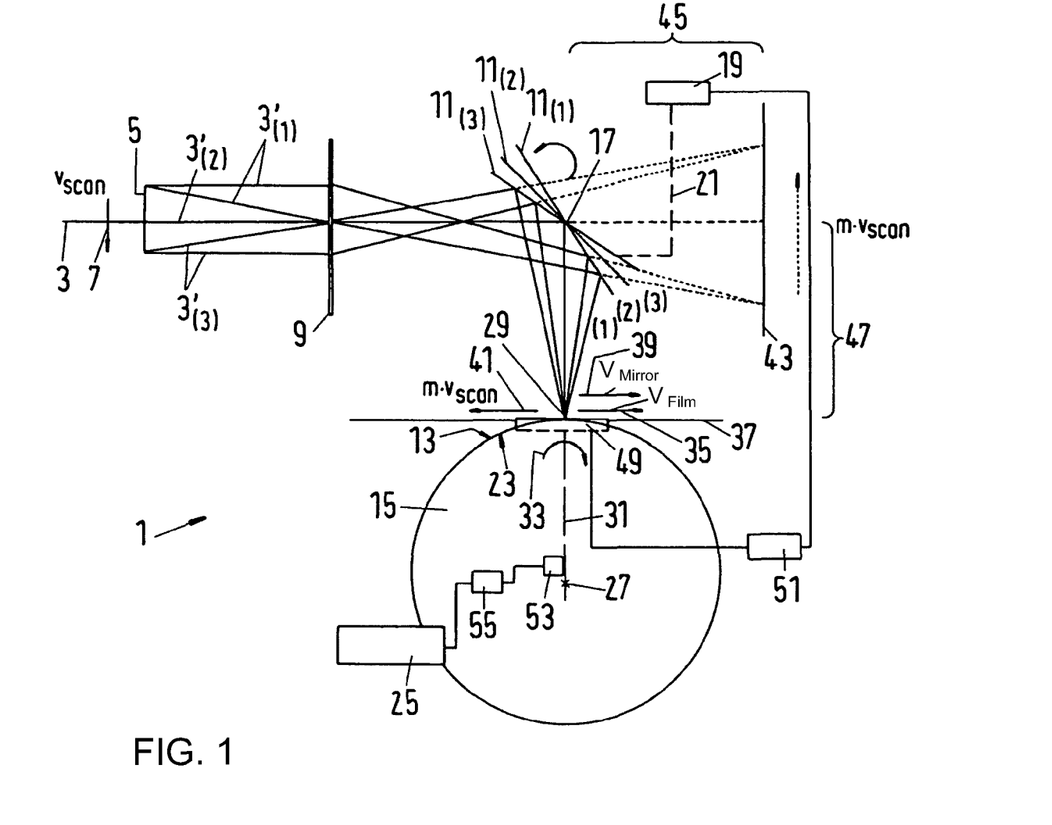
FIG. 1 shows a schematic illustration of a device for producing an individualized hologram, in which the spatial light modulator is scanned and directed onto the holographic recording material via a deflection mirror.

FIG. 1 schematically illustrates a device 1 for producing an individualized hologram. A light beam 3, which is preferably embodied in line-shaped or strip-shaped fashion and extends perpendicularly to the plane of the drawing, scans a spatial light modulator 5 at a speed $v_{scan}$. The spatial light modulator 5 is embodied as an LCD (Liquid Crystal Display), for example. Individual items of information are represented in the form of a pattern in pixelated fashion on the spatial light modulator 5, wherein the pixels can be driven individually. The individual pixels of the spatial light modulator 5 modulate the light beam 3 and convert the latter into an individually modulated light beam 3'.

The light beam 3 scans the spatial light modulator 5 at the speed $v_{scan}$ from top to bottom in the illustration of FIG. 1, as is indicated by means of an arrow 7. The individually modulated light beam 3' is illustrated at three successive times i=1, 2, 3, the sequence being indicated by a subscripted index placed between parentheses. The individually modulated light beam 3' is imaged by means of an imaging optical unit 9 having a magnification factor m. By means of a deflection mirror 11 mounted in rotatable fashion, the individually modulated light beam 3' is directed onto a holographic recording material 13, which is fed in a manner bearing on a drum 15. The deflection mirror 11 can be rotated about a mirror rotation axis 17, which preferably lies in the mirror plane of the deflection mirror 11. For this purpose, the deflection mirror 11 is coupled to a drive unit 19, which is indicated by means of a dashed line 21.

In order to record a hologram in the holographic recording material 13, the individually modulated light beam 3' radiates through said holographic recording material and impinges on a holographic master 23 incorporated into the drum 15. The holographic master 23 is preferably incorporated into a lateral surface of the drum 15. The holographic master 23 can extend along the entire circumference of the drum 15. Embodiments in which a plurality of identical or different holographic masters are incorporated into the drum 15 are likewise possible.

The drum 15 is coupled to a drum drive unit 25. The latter brings about a rotation of the drum about a drum axis 27. The drum rotation axis 27 extends perpendicularly to the plane of the drawing. It is therefore parallel to the mirror rotation axis 17 and to the direction in which the strip-shaped light beam and the individually modulated strip-shaped light beam extend. The individually modulated light beam 3' therefore impinges on the holographic recording material along an impinging line 29, which is likewise parallel to the drum rotation axis 27. The impinging line 29 preferably lies on a connecting line 31 of the mirror rotation axis 17 and the drum rotation axis 27.

During the recording of the individualized hologram, in the example illustrated, the drum 15 rotates in the clockwise direction, as is indicated by means of an arrow 33. In a tangential plane 37 of the holographic recording material 13 at the impinging line 29, the recording material 13 therefore moves at a tangential speed $v_{film}$, as is indicated by means of a corresponding vector 35. A rotational or pivoting speed of the deflection mirror 11 is chosen such that a stationary individually modulated light beam would always be imaged at the same location of the film. This is tantamount to the deflection mirror 11 being moved at a speed such that the impinging line 29 moves in the tangential plane 37 at a speed $v_{mirror}$, as is indicated by means of a vector 39, which speed corresponds to the tangential speed of the holographic recording material $v_{film}$ ($v_{mirror} = v_{film}$).

On account of the scanning speed $v_{scan}$ of the light beam 3 at which the spatial light modulator 5 is scanned, the impinging line 29 would move in the tangential plane 37, with deflection mirror 11 not rotating, at a speed $m \cdot v_{scan}$ oppositely to the direction of movement of the holographic recording material, as is indicated by means of a speed vector 41. In this case, the factor m indicates the magnification of the imaging optical unit 9. If the deflection mirror 11 were imagined to be absent, then the individually modulated imaged light beam 3' would be imaged on a screen 43, the distance 45 of which from the mirror rotation axis 17 is equal to the distance 47 of the impinging line 29 or of the holographic recording material 13 or of the tangential plane 37 from the mirror rotation axis 17. In order to ensure that the impinging line 29 remains stationary with respect to the drum rotation axis 27, care should therefore be taken to ensure that the speed of the holographic recording material $v_{film}$ is equal to the rotational speed of the mirror or the speed $v_{mirror}$ of the impinging line 29 in the tangential plane 37, and the speed $m \cdot v_{scan}$ of the impinging line 29 owing to the scanning speed and the magnifying imaging is equal in magnitude and opposite to the tangential speed of the holographic recording material $v_{film}$. i.e. $-m \cdot v_{scan} = v_{film} = v_{mirror}$.

In order to ensure, therefore, that the impinging line 29 remains stationary with respect to the drum rotation axis 27, a position-sensitive, light-sensitive sensor 49 is arranged along the axial direction 27, that is to say in a manner emerging from the plane of the drawing, outside the imaging region of the hologram, preferably alongside the drum 15, said sensor being illustrated by dashed lines and being situated above the plane of the drawing. With said sensor it is possible to detect a drift of the impinging line in the tangential plane 37. For this purpose, the position-sensitive, light-sensitive sensor 49 is connected to a controller 51, which in turn drives the drive unit 19, with the result that a closed control loop is formed.

Arranged on the drum 15 is an incremental encoder 53, by means of which the position of the drum 15 and thus a position of the holographic recording material 13 bearing thereon can be determined. By means of a further control unit 55, the drum drive unit 25 can thus be controlled, or alternatively a unit that determines the scanning speed of the light beam 3.

As is evident from the beam paths of the individually modulated light beam $3'_{(i)}$ of the imaged individually modulated light beam $3'_{(i)}$ and the positions of the deflection mirror $11_{(i)}$ ($i=1, 2, 3$), which are in each case depicted at three successive times $i=1, 2, 3$, it is evident that, in the case of this embodiment, an impinging angle $\alpha_i$ measured relative to a normal to the surface of the tangential plane 37 changes slightly during the recording of the individualized hologram.

Figure 2A:
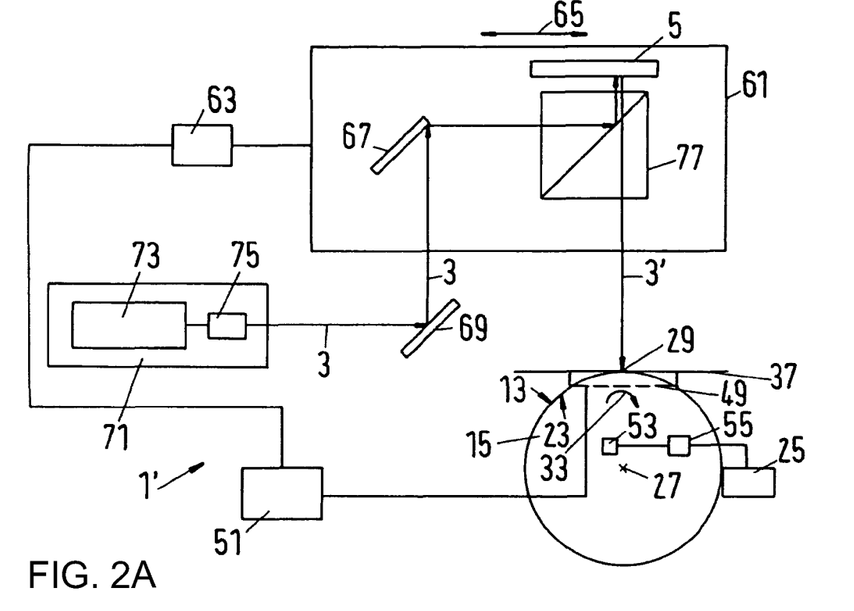
FIGS. 2*a* and 2*b* show two temporally successive views of another embodiment of a device for producing individualized holograms, in which scanning of the spatial light modulator and compensation of movement of the holographic recording material are effected by means of a translational displacement.
Figure 2B:
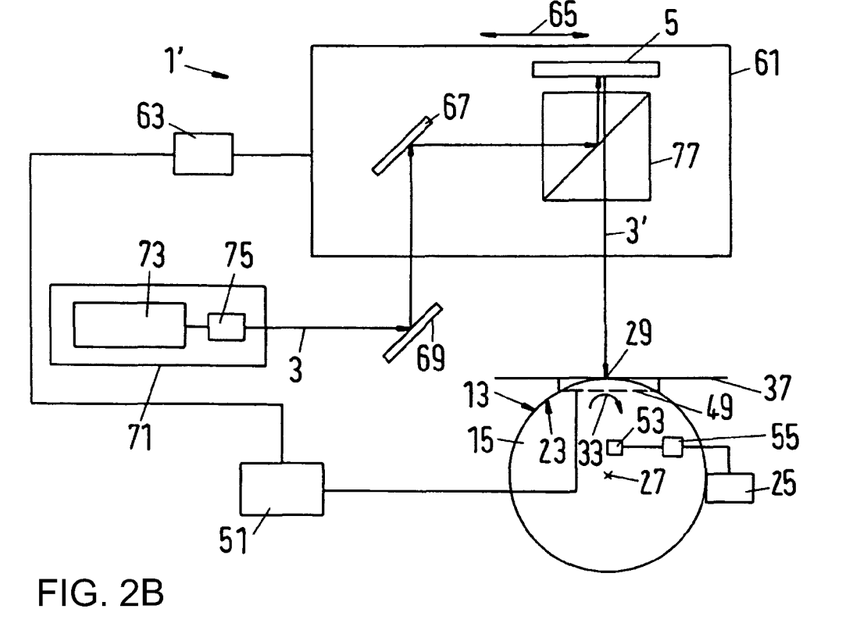

FIGS. 2a and 2b illustrate a further embodiment of a device 1' for producing an individualized hologram schematically at different successive points in time. Identical technical features are provided with identical reference symbols. This embodiment of the device 1' comprises an optical individualization system 61. The optical individualization system 61 can be displaced in a translational manner transversely with respect to the drum rotation axis 27 by means of a displacement unit 63, as is indicated by means of a double-headed arrow 65. The optical individualization system 61 can comprise for example an optical table that can be displaced in a translational manner (not illustrated). The optical individualization system 61 comprises a deflecting mirror 67, which is oriented at 45° with respect to a coherent light beam 3 from a strip light source 71, said light beam being embodied in strip-shaped fashion or in line-shaped fashion and being incident from a further deflecting mirror 69. The strip light source 71 preferably comprises a laser 73, which generates coherent light, and also a strip generating optical unit 75, which can be embodied for example as a cylindrical lens or as a holographic optical element for generating a strip-shaped light beam.

A translational movement parallel to the direction indicated by the double-headed arrow 65 brings about, via the deflecting mirror 67, a beam offset on a polarizing beam splitter cube 77 or the spatial light modulator 5. In this embodiment, the spatial light modulator 5 is preferably embodied as Liquid Crystal on Silicon (LCoS). In the case of this spatial light modulator embodied in areal fashion, the individual pixels can be driven freely as in the case of an LCD display. Here, in the same way as in the embodiment according to FIG. 1, the individualizing pattern for the individualized hologram can be represented during the entire scan duration. Synchronization with the scanning speed or a speed $v_{film}$ of the holographic recording material 13 is not necessary. The light—incident on the beam splitter cube 77 from the deflecting mirror 67—of the light beam 3 embodied in line-shaped fashion perpendicularly to the plane of the drawing is firstly reflected onto the spatial light modulator 5 at the beam splitter cube 77, pixel-individually modulated by the spatial light modulator and reflected back. In this case, a polarization is changed by comparison with that of the incident light beam 3. The individually modulated light beam 3' passes through the beam splitter cube 77 and impinges at the impinging line 29 on the holographic recording material 13 bearing on the drum 15.

No imaging optical unit is depicted, for reasons of simplification. A displacement speed $v_{trans}$ should therefore be chosen such that it corresponds to the speed of the holographic recording material in the tangential plane 37 on account of the rotation of the drum 15 about the drum rotation axis 27, i.e. $v_{film} = v_{trans}$. An advantage of this embodiment is that the individually modulated light beam 3' impinges on the holographic recording material always at the same position and at the same impinging angle. In this case, always at the same position is intended to mean that the impinging line 29 is stationary with respect to the drum rotation axis 27. In the case of this embodiment, the position-sensitive, light-sensitive sensor 49 together with the controller 51 and the displacement unit 63 form a closed control loop. As in the case of the embodiment according to FIG. 1, the speed of the holographic recording material 13 or of the drum 15 is controlled and regulated by means of the incremental encoder 53, the further control unit 55 and the drum drive unit 25. The tangential speed $v_{film}$ at which the holographic recording material 13 moves in the tangential plane 37 is chosen such that in the holographic recording material 13 during the radiation-passage duration, that is to say during the passage of the impinging line 29, a sufficient quantity of energy is deposited in the holographic recording material in order to store the holographically generated interference pattern in the holographic recording material 13.

FIG. 2b illustrates a temporally delayed position of the optical system 61. The holographic recording material 13 has also moved on account of the rotation of the drum 15 about the drum rotation axis 27 in the clockwise direction, that is to say toward the "right" in the plane of the drawing. That section of the holographic recording material 13 which is now situated at the impinging line thus corresponds to items of information which are situated on the spatial light modulator 5 on the "left" (relative to the plane of the drawing) of the items of information that were imaged onto the holographic recording material 13 in FIG. 2a.

The control loops described in connection with the embodiment according to FIG. 1 have a corresponding action in the case of the embodiment according to FIGS. 2a and 2b.

Figure 3:
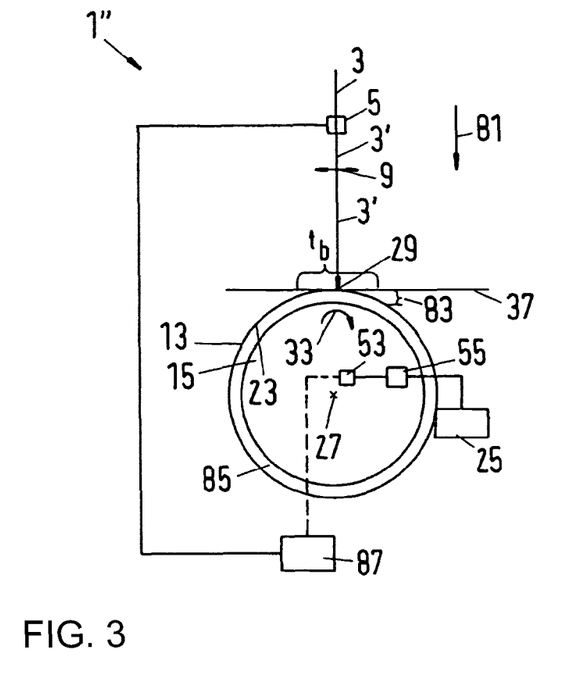
FIG. 3 shows an embodiment with a line-shaped spatial light modulator.

FIG. 3 shows an embodiment in which a spatial light modulator 5 is embodied as a line- or strip-shaped display. The latter comprises one or a plurality of lines of pixels, the pixel lines extending perpendicularly to the plane of the drawing. The line-shaped display can be an LCD display, for example. The light beam 3 embodied in strip- or line-shaped fashion perpendicularly to the plane of the drawing impinges on the spatial light modulator 5 embodied in strip- or line-shaped fashion and is individually modulated. The individually modulated light beam 3' then impinges on the holographic recording material 13, which is fed in a manner bearing on a drum 15 into which a holographic master 23 is incorporated. An exposure duration $t_b$ for a pixel line or a pixel strip is the time duration in which the pixel line or the pixel strip is imaged onto the holographic imaging material. During this time, the holographic imaging material moves by a distance $v_{film} \cdot t_b = s_b$. The exposure is preferably performed such that this results in a smallest possible change in a beam guiding length (imaging length) along the propagation direction 81 of the imaged individually modulated light beam 3'. This difference 83 in the imaging length has to be compensated for by means of the depth of field of the imaging optical unit 9. The pattern represented by the spatial light modulator 5 embodied in line-shaped fashion or strip-shaped fashion is changed in a manner synchronized with the rotation of the drum 15 in each case when the holographic recording material has moved by a distance $s_b$. The individualized holograms thus generated have the disadvantage that, if a whole-area pattern is intended to be represented, disturbances occur at the edges of the individual pixel lines or pixel strips, said disturbances originating from the non-uniform periods of illumination of the film material with the same individual information.

In order to achieve a synchronization of the drum rotational speed with the change in the individualizing information items represented by means of the spatial light modulator 5 embodied in line-shaped fashion, in the case of the embodiment according to FIG. 3, a position-sensitive, light-sensitive sensor 85 fixed to the drum 15 and preferably embodied circumferentially is arranged preferably on the lateral surface of the drum 15. In a manner dependent on the signals detected by said sensor, it is possible, by means of a controller 87, to control a frequency (line frequency) for changing the items of information represented by means of the spatial light modulator 5 embodied in line-shaped fashion or strip-shaped fashion. Likewise, the embodiment according to FIG. 3 can additionally or alternatively comprise an incremental encoder 53, the signal of which can alternatively or additionally likewise be used for controlling the line frequency. In other embodiments, the controller 87 can be embodied jointly with the further control unit 55 in order also to drive the drum drive unit 25.

In the case of the embodiment according to FIGS. 2a and 2b, the chosen impinging angle α of the individually modulated light beam 3' on the holographic recording material 13, measured with respect to a normal to the surface of the tangential plane 37, in the configuration illustrated is chosen to be equal to zero (α=0). However, if the optical individualization system 61 and also the further deflection mirror 69 and the light source 71 are pivoted rotationally about the impinging line 29, that is to say in the plane of the drawing, then it is possible to set any desired impinging angles between −90° and +90°. Since the impinging direction is constant in the case of the embodiment according to FIG. 2, highly angle-selective holographic masters can be used for the imaging. In the case of the embodiment according to FIG. 1 as well, the average impinging angle α can be set within limits by means of the elements involved in the imaging and individualization of the light beam likewise being pivoted about the impinging line 29 in the plane of the drawing. In principle, this likewise applies to the embodiment according to FIG. 3, but the imaging length differences that are to be compensated for by the depth of field of the imaging optical unit become larger if an impinging angle different than 0° is chosen.

The embodiments described merely represent exemplary embodiments. The individual features that have been described in connection with the exemplary embodiments can be used in any desired combination for realizing the invention.

| | List of reference symbols |
|---|---|
| 1, 1', 1" | Device for producing an individualized hologram |
| 3 | Light beam |
| 3' | Individually modulated light beam |
| 3'$_{(i)}$ | Individually modulated light beam at the point in time i |
| 5 | Spatial light modulator |
| 7 | Arrow |
| 9 | Imaging optical unit |
| 11$_{(i)}$ | Deflection mirror in the position at the point in time i |
| 13 | Holographic recording material |
| 15 | Drum |
| 17 | Mirror rotation axis |
| 19 | Drive unit |
| 21 | Dashed line (illustrating the coupling of the drive unit to the deflection mirror) |
| 23 | Holographic master |
| 25 | Drum drive unit |
| 27 | Drum rotation axis |
| 29 | Impinging line |
| 31 | Connecting line |
| 33 | Arrow |
| 35 | Speed vector $v_{film}$ |
| 37 | Tangential plane |
| 39 | Speed vector $v_{mirror}$ |
| 41 | Speed vector $-m \cdot v_{scan}$ |
| 43 | Screen |
| 45 | Distance between mirror rotation axis - screen |
| 47 | Distance between mirror rotation axis - impinging lines/holographic recording material/tangential plane |
| 49 | Position-sensitive light-sensitive |

-continued

| | List of reference symbols | |
|---|---|---|
| | sensor | |
| 51 | Controller | |
| 53 | Incremental encoder | |
| 55 | Further control unit | |
| 61 | Optical system | |
| 63 | Displacement unit | |
| 65 | Double-headed arrow | |
| 67 | Deflecting mirror | |
| 69 | Further deflecting mirror | |
| 71 | Strip light source | |
| 73 | Laser | |
| 75 | Strip generating optical unit | |
| 77 | Beam splitter cube | |
| 81 | Propagation direction | |
| 83 | Difference in the imaging length | |
| 85 | Sensor | |
| 87 | Controller | |

The invention claimed is:

1. A method for producing individualized holograms, which comprises the steps of:
generating a light beam;
individually modulating the light beam in a spatial light modulator resulting in an individually modulated light beam;
guiding the individually modulated light beam onto a holographic recording material disposed relative to a holographic master and the individually modulated light beam is guided such that at least part of the individually modulated light beam is at least one of diffracted and reflected at the holographic master and is brought to interference with the individually modulated light beam in the holographic recording material, such that an interference pattern representing an individualized hologram forms in the holographic recording material, wherein the individually modulated light beam is moved relative to the holographic recording material and the holographic master for scanning the holographic master entirely;
disposing the recording material in a manner bearing on a cylindrical drum, and continuously rotating the cylindrical drum about a drum rotation axis of the cylindrical drum during the scanning of the holographic master, the individually modulated light beam being guided such that the individually modulated light beam impinges on the cylindrical drum in a stationary fashion with respect to the drum rotation axis, although the individually modulated light beam impinges on the cylindrical drum in the stationary fashion with respect to the drum rotation axis, information transported by the individually modulated light beam moves in a manner synchronized with a drum movement;
directing the individually modulated light beam via a deflection mirror, the deflection mirror being mounted such that it can be rotated about a mirror rotation axis, onto the holographic recording material, the deflection mirror being rotated at a rotational speed, such that the individually modulated light beam impinges on the holographic recording material in the stationary fashion relative to the drum rotation axis of the cylindrical drum; and
defining the rotational speed of the deflection mirror such that, for the individually modulated light beam that is considered to be stationary before deflection, one of an impinging line and an impinging location of the individually modulated light beam on the holographic recording material moves in a tangential plane of the holographic recording material at a speed corresponding to a tangential speed of the holographic recording material on account of a rotation of the cylindrical drum, and a scanning speed is defined such that one of the impinging line and the impinging location of the individually modulated light beam on the holographic recording material moves, with the deflection mirror not rotating, in the tangential plane at a speed which compensates for the tangential speed of the holographic recording material on account of the rotation of the cylindrical drum.

2. The method according to claim 1, which further comprises generating the light beam as one of a strip-shaped light beam and a line-shaped light beam.

3. The method according to claim 1, which further comprises incorporating the holographic master into the cylindrical drum.

4. The method according to claim 1, which further comprises forming the spatial light modulator as a line display and the light beam is individually modulated by means of the line display.

5. The method according to claim 2, which further comprises embodying the spatial light modulator in an areal fashion and is scanned by means of the strip-shaped light beam to modulate the light beam.

6. The method according to claim 1, which further comprises choosing a drum rotational speed of the drum in a manner dependent on an intensity of the light beam such that a quantity of energy introduced into the holographic recording material, during a period of passage of radiation that arises on account of the rotation of the drum with respect to the individually modulated light beam, if the individually modulated light beam is stationary with respect to the drum rotation axis, corresponds to a quantity of energy appropriate for recording the individualized hologram in the holographic recording material.

7. The method according to claim 1, which further comprises evaluating a position of the cylindrical drum with an aid of an incremental encoder and a drum rotational speed is controlled by this means.

8. A method for producing individualized holograms, which comprises the steps of:
generating a light beam;
individually modulating the light beam in a spatial light modulator resulting in an individually modulated light beam;
guiding the individually modulated light beam onto a holographic recording material disposed relative to a holographic master and the individually modulated light beam is guided such that at least part of the individually modulated light beam is at least one of diffracted and reflected at the holographic master and is brought to interference with the individually modulated light beam in the holographic recording material, such that an interference pattern representing an individualized hologram forms in the holographic recording material, wherein the individually modulated light beam is moved relative to the holographic recording material and the holographic master for scanning the holographic master entirely;
disposing the recording material in a manner bearing on a cylindrical drum, and continuously rotating the cylindrical drum about a drum rotation axis of the cylindrical drum during the scanning of the holographic master, the individually modulated light beam being guided such that the individually modulated light beam impinges on the cylindrical drum in a stationary fashion with respect to the drum rotation axis, although the individually modulated light beam impinges on the cylindrical drum in the stationary fashion with respect to the drum rotation axis, information transported by the individually modulated light beam moves in a manner synchronized with a drum movement;

disposing at least one position-dependent, light-sensitive sensor in a direction of the drum rotation axis outside an illumination region for the individualized hologram, alongside the cylindrical drum, in a tangential plane of the impinging line of the individually modulated light beam on the holographic recording material or thereabove, wherein the individually modulated light beam is embodied such that the position-dependent, light-sensitive sensor, when radiation passes through the holographic recording material, is swept over by a marginal region of the individually modulated light beam and a rotational speed of a deflection mirror or a displacement speed of an optical individualization system is controlled by means of a closed control loop in order to keep an impinging line of the individually modulated light beam on the holographic recording material stationary with respect to the drum rotation axis.

9. A device for producing individualized holograms, comprising:

a light source for generating a coherent light beam;

a spatial light modulator for individually modulating the coherent light beam into an individually modulated light beam;

means for at least one of guiding or imaging of the coherent light beam;

a holographic master disposed downstream of said spatial light modulator; and a feeding unit that can be used to arrange a holographic recording material with respect to passage of radiation from the individually modulated light beam relative to said holographic master, the individually modulated light beam is guided such that at least part of the individually modulated light beam is at least one of diffracted and reflected at said holographic master and is superimposed via the modulated light beam on the holographic recording material, such that an interference pattern representing an individualized hologram forms in the holographic recording material, wherein the modulated light beam is moved relative to the holographic recording material and said holographic master to scan the holographic master entirely, said feeding unit having a cylindrical drum with a drum rotation axis and a drum drive unit, said cylindrical drum configured to bear the holographic recording material in a manner bearing on said cylindrical drum and being relative to said holographic master, said cylindrical drum is coupled to said drum drive unit to continuously rotate said cylindrical drum about said drum rotation axis during a scanning of said holographic master;

wherein one of said means for at least one of guiding or imaging of the coherent light beam is movable such that the individually modulated light beam impinges on said cylindrical drum in a stationary fashion with respect to the drum rotation axis and that, although the individually modulated light beam impinges on said cylindrical drum in the stationary fashion with respect to the drum rotation axis, information transported by the individually modulated light beam moves in a manner synchronized with a drum movement;

a deflection mirror mounted such that said deflection mirror can be rotated about a mirror rotation axis and disposed relative to said spatial light modulator and said cylindrical drum for directing the individually modulated light beam onto the holographic recording material; and a drive unit coupled to said deflection mirror, said drive unit controlling a rotational speed of said deflection mirror such that for the individually modulated light beam that is considered to be stationary before a deflection, one of an impinging line and an impinging location of the individually modulated light beam on the holographic recording material moves in a tangential plane of the holographic recording material at a speed which corresponds to a tangential speed of the holographic recording material on account of a rotation of said cylindrical drum, and a scanning speed for scanning of said spatial light modulator is defined such that the impinging line or the impinging location of the individually modulated light beam on the holographic recording material moves, with said deflection mirror not rotating, in the tangential plane at a speed which compensates for the tangential speed of the holographic recording material on account of the rotation of said cylindrical drum.

10. The device according to claim 9, wherein said holographic master is incorporated into said cylindrical drum.

11. The device according to claim 9, wherein said light source is a strip light source that generates a strip-shaped light beam.

12. The device according to claim 9, wherein said light source is a strip generating optical unit for generating a strip-shaped light beam, and contains at least one of a cylindrical lens and a holographic optical element.

13. The device according to claim 9, wherein said spatial light modulator is a line display.

14. The device according to claim 9, wherein said spatial light modulator is embodied in an areal fashion.

15. The device according to claim 9, wherein said drive unit controlling the rotational speed of said deflection mirror such that said deflection mirror is rotated at a speed such that the individually modulated light beam impinges on the holographic recording material in a stationary fashion relative to said drum rotation axis of said cylindrical drum.

16. The device according to claim 9, wherein a drum rotational speed of said cylindrical drum can be chosen in a manner dependent on an intensity of the light beam such that a quantity of energy introduced into the holographic recording material, during a period of passage of radiation that arises on account of the rotation of said cylindrical drum with respect to the individually modulated light beam, if the individually modulated light beam is stationary with respect to the drum rotation axis, corresponds to a quantity of energy appropriate for recording the individualized hologram in the recording material.

17. The device according to claim 9, further comprising:
an incremental encoder disposed on said cylindrical drum; and
a further control unit for controlling the drum rotational speed on a basis of signals of said incremental encoder.

18. The device according to claim 9, wherein firstly, elements required for individualizing, guiding and imaging the light beam jointly and, secondly, said cylindrical drum are embodied such that they can be pivoted relative to one another about a pivoting axis defined by an impinging line of the individually modulated light beam in order to be able to vary an impinging direction of the individually modulated light beam on at least one of the holographic recording material and said holographic master.

19. A device for producing individualized holograms, comprising:

a light source for generating a coherent light beam;

a spatial light modulator for individually modulating the coherent light beam into an individually modulated light beam;

means for at least one of guiding or imaging of the coherent light beam;

a holographic master disposed downstream of said spatial light modulator; and a feeding unit that can be used to arrange a holographic recording material with respect to passage of radiation from the individually modulated light beam relative to said holographic master, the individually modulated light beam is guided such that at least part of the individually modulated light beam is at least one of diffracted and reflected at said holographic master and is superimposed via the modulated light beam on the holographic recording material, such that an interference pattern representing an individualized hologram forms in the holographic recording material, wherein the modulated light beam is moved relative to the holographic recording material and said holographic master to scan the holographic master entirely, said feeding unit having a cylindrical drum with a drum rotation axis and a drum drive unit, said cylindrical drum configured to bear the holographic recording material in a manner bearing on said cylindrical drum and being relative to said holographic master, said cylindrical drum is coupled to said drum drive unit to continuously rotate said cylindrical drum about said drum rotation axis during a scanning of said holographic master;

wherein one of said means for at least one of guiding or imaging of the coherent light beam is movable such that the individually modulated light beam impinges on said cylindrical drum in a stationary fashion with respect to the drum rotation axis and that, although the individually modulated light beam impinges on said cylindrical drum in the stationary fashion with respect to the drum rotation axis, information transported by the individually modulated light beam moves in a manner synchronized with a drum movement;

a deflection mirror mounted such that said deflection mirror can be rotated about a mirror rotation axis and disposed relative to said spatial light modulator and said cylindrical drum for directing the individually modulated light beam onto the holographic recording material;

a closed control loop with a controller; and at least one position-sensitive, light-sensitive sensor disposed in a direction of said drum rotation axis outside an illumination region for the individualized hologram, alongside said cylindrical drum, in a tangential plane of an impinging line of the individually modulated light beam on the holographic recording material or thereabove, the individually modulated light beam is embodied such that said position-sensitive, light-sensitive sensor, when radiation passes through the holographic recording material, is swept over by a marginal region of the individually modulated light beam and said position-sensitive, light sensitive sensor is integrated into said closed control loop with said controller designed for controlling the rotational speed of said deflection mirror or a displacement speed of said optical system in order to keep an impinging line of the light beam on the holographic recording material stationary with respect to said drum rotation axis.

20. The device according to claim 19, further comprising at least one further position-sensitive and light-sensitive sensor disposed relative to a drum axial direction at an opposite end of an illumination region for the individualized hologram.

\* \* \* \* \*